US007707602B2

(12) United States Patent
Cragun et al.

(10) Patent No.: US 7,707,602 B2
(45) Date of Patent: Apr. 27, 2010

(54) SQUEEZABLE REBROADCAST FILES (75) Inventors: Brian John Cragun, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 11/101,059

(22) Filed: Apr. 7, 2005

(65) Prior Publication Data

US 2005/0183111 A1    Aug. 18, 2005

Related U.S. Application Data

(63) Continuation of application No. 09/751,125, filed on Dec. 28, 2000, now Pat. No. 6,964,061.

(51) Int. Cl.
*H04N 7/16* (2006.01)

(52) U.S. Cl. .............................. 725/28; 725/29; 725/75; 725/76; 725/86; 725/87; 725/88; 725/90; 725/93; 348/460

(58) Field of Classification Search ............. 725/34–36, 725/32, 86–88, 90–94, 28–29, 460, 75–76; 348/460

See application file for complete search history.

(56) References Cited

U.S. PATENT DOCUMENTS 5,012,334 A    4/1991  Etra (Continued)

FOREIGN PATENT DOCUMENTS

EP    000528642 A2 *  2/1993

(Continued)

OTHER PUBLICATIONS

MPEG-7 Multimedia Description Schemes WD, Jul. 2000, International Organization for Standardization, Version 3.1.*

(Continued)

*Primary Examiner*—John W Miller
*Assistant Examiner*—Sumaiya A Chowdhury
(74) *Attorney, Agent, or Firm*—Matthew J. Bussan (57) ABSTRACT

A method of providing rebroadcast programming includes encoding a rebroadcast program, specifying a preferred play time, and providing a broadcast that fits the preferred play time. The encoding of the rebroadcast program can use a replay plan which prioritizes portions of the rebroadcast. A priority can be assigned to commercials which have been made to be shortened or dropped, or an alternative commercial substituted, depending on time limitations. A rebroadcast packaging and playlist are provided. The specifying a preferred play time can be done by one of the following ways: specifying the preferred play time in response to a specific user request; specifying the preferred play time based on a user profile; specifying the preferred play time automatically by another program; connecting a replay timing to other events, wherein the other events includes setting an automatic pause when phone calls come in, lengthening a rebroadcast on certain days, and shortening a rebroadcast based on location of an automobile; providing a radio/television player which has functions of pause and replay which can be selected by the user to deduct time dynamically during the rebroadcast and which performs at least one of: replaying the broadcast; reacting to the need to pause/rewind; respecifying the adjusted time; playing unlistened to material at a later time; and displaying a list of unlistened/unviewed segments. A default play time for the rebroadcast program is used if no time is otherwise specified.

17 Claims, 7 Drawing Sheets

U.S. PATENT DOCUMENTS

| | | | | |
|---|---|---|---|---|
| 5,589,945 | A | * | 12/1996 | Abecassis .................... 386/83 |
| 5,614,940 | A | * | 3/1997 | Cobbley et al. ............. 725/138 |
| 5,805,763 | A | * | 9/1998 | Lawler et al. ................ 386/83 |
| 5,911,046 | A | | 6/1999 | Amano |
| 5,956,026 | A | * | 9/1999 | Ratakonda .................. 715/723 |
| 5,995,095 | A | * | 11/1999 | Ratakonda ............... 715/500.1 |
| 6,233,389 | B1 | | 5/2001 | Barton et al. |
| 6,236,395 | B1 | * | 5/2001 | Sezan et al. ................. 715/723 |
| 6,298,482 | B1 | * | 10/2001 | Seidman et al. ............ 725/101 |
| 6,351,707 | B1 | * | 2/2002 | Ichikawa .................... 701/209 |
| 6,370,688 | B1 | | 4/2002 | Hejna, Jr. |
| 6,504,990 | B1 | | 1/2003 | Abecassis |
| 6,510,556 | B1 | | 1/2003 | Kusaba et al. |
| 6,581,207 | B1 | * | 6/2003 | Sumita et al. ................ 725/46 |
| 6,701,523 | B1 | | 3/2004 | Hancock et al. |
| 6,757,482 | B1 | * | 6/2004 | Ochiai et al. ................ 725/48 |
| 6,810,527 | B1 | * | 10/2004 | Conrad et al. ................ 725/76 |
| 6,868,440 | B1 | * | 3/2005 | Gupta et al. ................ 709/219 |
| 7,293,280 | B1 | * | 11/2007 | Gupta et al. ................ 725/139 |
| 2002/0032907 | A1 | * | 3/2002 | Daniels ....................... 725/51 |
| 2005/0028194 | A1 | * | 2/2005 | Elenbaas et al. .............. 725/32 |
| 2005/0108758 | A1 | * | 5/2005 | Jun ............................. 725/50 |

FOREIGN PATENT DOCUMENTS

| | | | |
|---|---|---|---|
| EP | 000555028 A2 | * | 8/1993 |
| EP | 000597450 A2 | * | 5/1994 |
| EP | 000782139 A2 | * | 7/1997 |
| WO | WO 99/03275 | * | 1/1999 |

OTHER PUBLICATIONS

Burke et al., Programme Generation, WO 99/03275, Jan. 21, 1999.*
Elenbaas et al., Apparatus and Method for Optimizing Keyframe and Blob Retrieval and Storage, WO 99/28835, Jun. 10, 1999.*
Ratakonda et al., Hierarchical Video Summarization, Jan. 1999, IS&T/SPIE Conference on Visual Communications and Imaging Processing.*
Pope et al., Video Abstraction: Summarizing Video Content for Retrieval and Visualization, 1998, IEEE.*
Lienhart, Video Abstracting, Dec. 1997, Communication of ACM.*

* cited by examiner

SEGMENT RECORD

| TITLE |
|---|
| LENGTH |
| PRIORITY |
| LOCATION |
| STATUS: PLANNED/PLAYED/HIDDEN/FORGOTTEN |
| NEXT |
| PREVIOUS |
| ALTERNATE |

FIG. 3

PROGRAM FILE

| SEGMENT RECORD |
|---|
| ... |
| ... |
| |
| PROGRAM DATA |
| ... |
| ... |
| ... |

SQUEEZABLE REBROADCAST FILES

CROSS-REFERENCE TO RELATED APPLICATION CLAIMING BENEFIT UNDER 35 U.S.C. 120

This application is a continuation application of U.S. patent application Ser. No. 09/751,125, filed Dec. 28, 2000 now U.S. Pat. No. 6,964,061, entitled "Squeezable Rebroadcast Files", which is hereby incorporated by reference.

BACKGROUND OF THE INVENTION

1. Field of the Invention

The invention relates to the field of broadcast programming, such as radio and video broadcasts, transmitted over the Internet, for example.

2. Background Information

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Computer systems typically include operating system software that control the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a software application running on one computer system.

One significant computer network that has recently become very popular is the Internet. The Internet grew out of the modern proliferation of computers and networks, and has evolved into a sophisticated worldwide network of computer systems linked together by web pages that collectively make up the "world-wide web", or WWW. A user at an individual PC (i.e., workstation) that wishes to access the WWW typically does so using a software application known as a web browser. A web browser makes a connection via the WWW to other computers known as web servers, and receives information from the web servers that is displayed on the user's workstation. Information displayed to the user is typically organized into pages that are constructed using a specialized language called Hypertext Markup Language (HTML).

Besides images and text, other media are becoming available for downloading from and/or listening to/viewing on the Internet, such as music, video, and even live and recorded, rebroadcast, television and radio programs. Video as used here is meant to cover and include any and all computer generated visual image/display element sequences, that is, besides what is traditionally thought of as video, here the term should be read to include computer generated animation, algorithmically sequenced display elements, such as with Shockwave™ type files, applets, and the like.

However, as radio and video broadcasts become rebroadcast over the Internet, their length becomes a critical limiting factor. People will wish to hear a favorite program using their desktop computer or other Internet accessing device, but may only have time to hear, or would simply prefer to only hear, an abbreviated version.

Disadvantageously, currently rebroadcasting uses the same format as live shows, and most are not intended to be shortened when they are produced. When they are shortened, it is generally at the end. That is, abbreviated broadcasts are normally achieved by cutting off the end of the program.

In a news cast, for example, more important stories are put at the front and less important at the end, in case the listener/viewer changes the station. The hope is that the listener will stay as long as possible. In this case, the assumption is that if they lose the listener, they will have gotten in their early commercials. However, this is not optimal because a broadcaster also may want to put some relatively important things at the end to keep listeners/viewers tuned in through the whole program.

Professional broadcasters know how to "squeeze" a news program depending on circumstances. If they only have four minutes instead of five, because a live interview runs long, for example, they may drop out a less important story in the middle.

However, people want to determine on their own when they watch/listen to things, and what they watch/listen to, over the Internet. Also, more and more, Internet-access, telecommunication, information and entertainment are being integrated into one device. For live broadcast media, such as radio and television, so-called channel-surfing has become a prevalent activity, and on the Internet, so-called web-surfing is prevalent. In either case, if a listener/viewer gets bored with what they are tuned in to, they search for more interesting and/or informative material. Programming guides, advertising and Internet search engines, for example, aid a user in finding material of interest. However, a viewer of a news program, for example, may grow impatient waiting for the one story of interest to come on. The viewer may not have the time or patience to wait for the material of interest to appear, and this can be frustrating.

If a person is watching a recorded program on video tape, they can use fast-forward to get to material they wish to view. However, they still have to go serially through the tape to get to the desired material. On the other hand, if using a compact disc (CD) on a CD player, or a digital video disk (DVD) on a DVD player, which are essentially a random access memory devices, the user can go to an index, select material of interest, and conveniently jump directly to the desired material, for example. A user may also be able to program the CD/DVD device to play the indexed material of interest and skip the other material.

Internet search engines give a user the ability to filter through the bountiful stored information accessible on the Internet to find only particular subject matter that the user is interested in because much of the information stored and accessible over the Internet is essentially accessible like a CD/DVD. That is, the Internet is in a way like a giant random access memory. The exceptions of course are things like live web-cams, cameras that allow a remote Internet user to view a scene essentially in real-time, where it cannot be predicted exactly what may come in to view, and live or real-time broadcast material which has not been preprogrammed or prerecorded. However, broadcast materials which have been prerecorded and stored digitally have the potential for convenient random access through indexing, programming selections, and the like.

It is apparent that it would be advantageous to be able to apply random access capabilities to broadcast materials accessible over the Internet. Therefore, to overcome the problems and limitations in the prior art, it would be advantageous to provide a broadcast that can be accessed in a way that fits the time and needs of the listener.

SUMMARY OF THE INVENTION

It is, therefore, a principal object of the invention to provide a method and apparatus for facilitating squeezable rebroadcast files.

It is another object of the invention to provide a method and apparatus that solves the above mentioned problems so that a broadcast can be provided which fits the needs and time of listener.

These and other objects of the present invention are accomplished by the method and apparatus disclosed herein.

According to an aspect of the invention, a rebroadcast program is encoded with a replay plan which prioritizes portions of the rebroadcast.

According to an aspect of the invention, when a preferred play time is provided at the start, the resulting program is clipped to meet that time, the clipping coming anywhere in the broadcast (beginning, middle or end).

According to another aspect of the invention, the watcher/listener gets a "balanced" program, no matter the amount of time they watch.

According to another aspect of the invention, the preferred play time can be provided by a specific user request, e.g., "I only have four minutes", or "I prefer the shortened version today.".

According to another aspect of the invention, the preferred play time can be provided by the user profile, "I always prefer the shortened version", or automatically by another program, such as an automobile system which estimates there are so many minutes of drive time left based on time/speed/location, etc., a parental control system which dictates that a child only has so many minutes of viewing time left in their preassigned daily allocation, or a computer scheduling program which knows there is a meeting on your calendar in seven minutes.

According to another aspect of the invention, if no time is specified, the rebroadcast program has a default time to use, the default time being the full program as provided in a program file.

According to an aspect of the invention, commercials can also be given importance and be made to be shortened or dropped, or an alternative commercial substituted, depending on time limitations.

According to an aspect of the invention, rebroadcast occurs in at least two forms: on a feed from the remote server, e.g., a web server, or on a feed locally through a virtual player server. In each case, the desired time is provided up front (either from the user, a user profile, or automatically by another program) and the server (remote or local) adjusts the time by following the replay plan.

According to an aspect of the invention, the user can adjust the time in the middle of the broadcast—specifying more time is available, or less time is available, and the output is dynamically adjusted to the replay plan with the new time parameters.

According to an aspect of the invention, the listener gets the most desirable information in an order which spreads out the better information over the life of the rebroadcast.

According to an aspect of the invention, functions of pause and replay can be selected (by the user) to deduct time dynamically during the rebroadcast. Thus, if the user wants a 10 minute broadcast, and they rewind to hear an 800 number, or pause while they take a phone call, less important segments are dropped during the diversion, and the more important segments are given priority and still heard, yet the broadcast stays 10 minutes.

According to an aspect of the invention, provision is made for connecting replay timing to other events: for example, setting an automatic pause when phone calls come in; lengthening a rebroadcast on certain days, such as weekends; or shortening a rebroadcast based on the location of an automobile.

According to an aspect of the invention, provision is made for playing unlistened to material at a later time. For example, if the user paused during a 10 minute broadcast (or surfed to another channel) and 3 minutes of time were lost in the middle, an option would allow the user to unpause and listen to the entire program, thereby extending the total time to 13 minutes, or to keep the program time to 10 minutes by dropping three minutes of program, and then catch the lost 3 minutes another time when the listener has 3 minutes available.

According to an aspect of the invention, a list of unlistened/unviewed segments can be displayed.

According to an aspect of the invention, a rebroadcast packaging and playlist are provided.

According to another aspect of the invention, a radio/television player is provided which replays the broadcast and reacts to the need to pause/rewind, etc., and respecifies/resends the adjusted time to the server (remote or local).

According an aspect of the invention, the invention provides a number of advantages to rebroadcasters who will pick up additional customers they may otherwise miss. People want to determine themselves when they watch/listen to things and what they watch/listen to. Providing a broadcast that fits the time of the listener will get more listeners and more people to hear the advertisements. Advantageously, according to the invention, the broadcasters can arrange things so they keep the customer at the end of the rebroadcast.

According an aspect on the invention, the invention is equally applicable to digital radios and digital TV's, i.e., TIVO.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1:
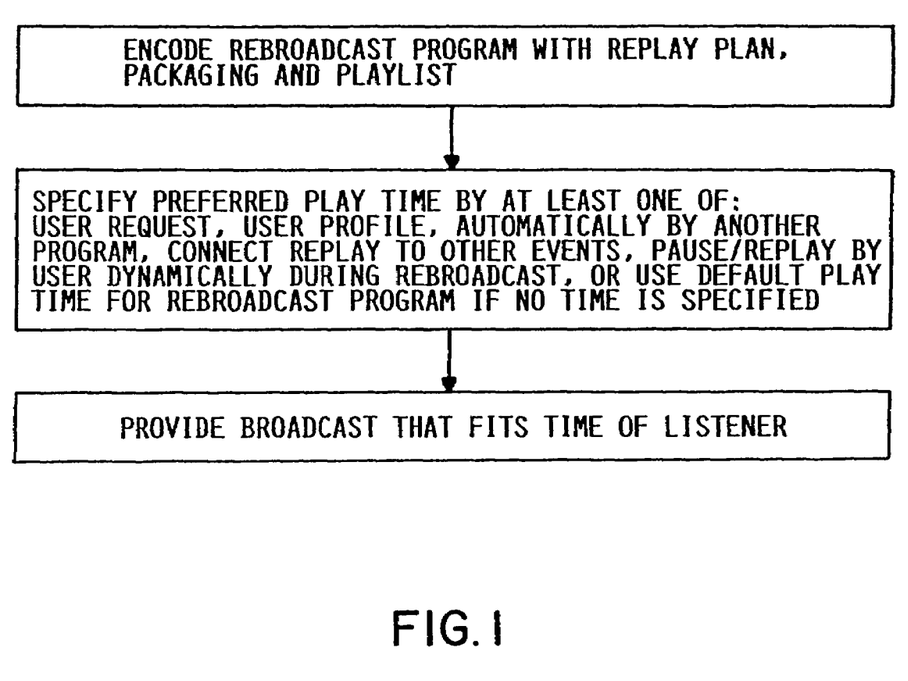
FIG. 1 illustrates a flow chart of a process according to an exemplary embodiment of the present invention.
Figure 2:
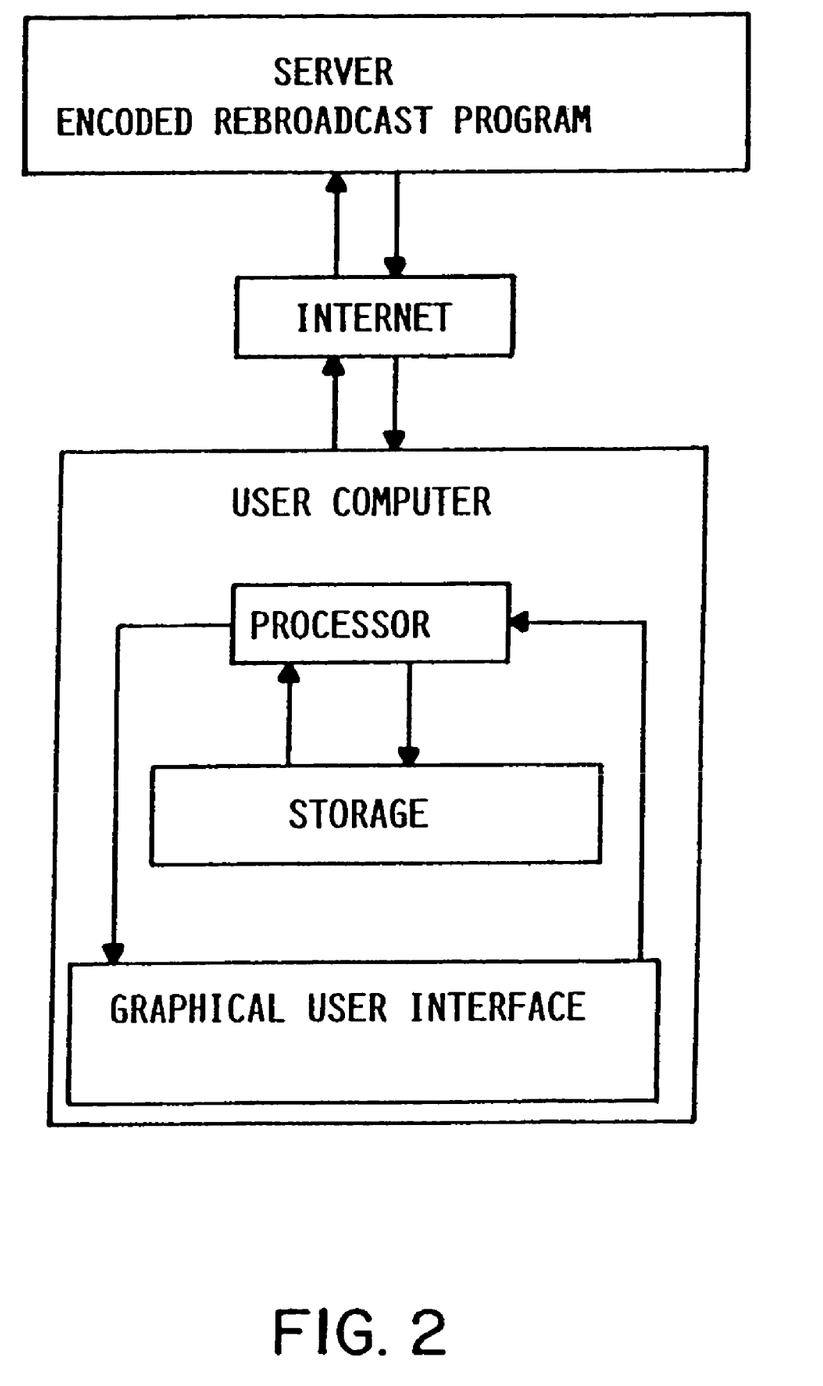
FIG. 2 illustrates a system for implementing the process according to an exemplary embodiment of the invention.

With reference to FIGS. 1 and 2, according to an aspect of the invention, a rebroadcast program is encoded with a replay plan which prioritizes portions of the rebroadcast. A preferred play time is then specified. When a preferred play time is provided at the start, the resulting program is clipped to meet that time, the clipping coming anywhere in the broadcast (beginning, middle or end). Thus, the watcher/listener gets a "balanced" program, no matter the amount of time they watch.

The preferred play time can be provided by a specific user request, e.g., "I only have four minutes", or "I prefer the shortened version today." Alternatively, the preferred play time can be provided by the user profile, "I always prefer the shortened version", automatically by another program, such as an automobile system which estimates there are so many minutes of drive time left, based on time/speed/location, etc., a parental control system which dictates that a child only has so many minutes of viewing time left in their preassigned daily allocation, or a computer scheduling program which knows there is a meeting on your calendar in seven minutes.

If no time is specified, the rebroadcast program has a default time to use, the default time being the full program as provided in a program file.

For example, a five minute Paul Harvey rebroadcast news program is requested to play in four minutes. Two news items from the center are dropped from the broadcast. If the same program is requested to play for only two minutes, six news items and one of the two commercials are dropped from various parts of the rebroadcast unit to meet that goal.

Commercials can also be given importance and be made to be shortened or dropped, or an alternative commercial substituted, depending on time limitations.

Rebroadcast occurs in at least two forms: on a feed from the remote server, e.g., a web server, or on a feed locally through a virtual player server. In each case, the desired time is provided up front (either from the user, a user profile, or automatically by another program) and the server (remote or local) adjusts the time by following the replay plan.

The user can adjust the time in the middle of the broadcast—specifying more time is available, or less time is available, and the output is dynamically adjusted to the replay plan with the new time parameters.

Provision is made for defaults if no desired time is provided. For example, the default time may be defined as being the full program as provided in a program file.

In this way the listener gets the most desirable information in an order which spreads out the better information over the life of the rebroadcast.

Functions of pause and replay can be selected (by the user) to deduct time dynamically during the rebroadcast. Thus, if the user wants a 10 minute broadcast, and they rewind to hear an 800 number, or pause while they take a phone call, less important segments are dropped during the diversion, and the more important segments are given priority and still heard, yet the broadcast stays 10 minutes.

Provision is made for connecting replay timing to other events: for example, setting automatic pause when phone calls come in; or lengthening a rebroadcast on certain days; shortening a rebroadcast based on location of an automobile.

Provision is made for playing unlistened to material at a later time. For example, if paused during the 10 minute broadcast (or surfed to another channel) and 3 minutes of time were lost in the middle, an option would allow the user to unpause and listen to the entire program, thereby extending the total time to 13 minutes, or to keep the program time to 10 minutes by dropping three minutes of program, and then catch the lost 3 minutes another time when the listener has 3 minutes available.

A list of unlistened/unviewed segments can be displayed.

According to an aspect of the invention, a rebroadcast packaging and playlist are provided. According to another aspect of the invention, a radio/television player is provided which replays the broadcast and reacts to the need to pause/rewind, and resends the adjusted time to the server (remote or local).

The invention provides a number of advantages to rebroadcasters who will pick up additional customers they may otherwise miss. People want to determine themselves when they watch/listen to things and what they watch/listen to. Providing a broadcast that fits the time of the listener will get more listeners and more people to hear the advertisements.

Currently rebroadcasting uses the same format as live shows. Most are not intended to be shortened. When they are shortened, it is at the end. They put important things at the front and less important at the end, hoping that the listener will stay as long as possible. In these cases, the assumption is that if they lose the listener, they will have gotten in their early commercials. Advantageously, according to the invention, the broadcasters can arrange things so they keep the customer at the end of the rebroadcast.

The invention is equally applicable to digital radios and digital TV's, i.e., TIVO.

With reference to FIG. 1, an exemplary process according to the invention may include the following operations:

1) encode a rebroadcast program with a replay plan which prioritizes portions of the rebroadcast, assign a priority to commercials, commercials are made to be shortened or dropped, or an alternative commercial substituted, depending on time limitations, the broadcasters can arrange things so they keep the customer at the end of the rebroadcast, provide a rebroadcast packaging and playlist, rebroadcast occurs in two forms:
   on a feed from the remote server, or
   on a feed locally through a virtual player server, 2) provide a preferred play time at the start, the server (remote or local) adjusts the time by following the replay plan
   a) select the preferred play time in response to a specific user request
   b) select the preferred play time based on a user profile
   c) select the preferred play time automatically by another program
     1) an automobile system which estimates there are so many minutes of drive time left
     2) a parental control system which dictates that a child only has so many minutes of viewing time left in their daily allocation 3) a computer which knows there is a meeting on your calendar in seven minutes d) connect replay timing to other events
  1) set automatic pause when phone calls come in,
  2) lengthen a rebroadcast on certain days; or
  3) shorten a rebroadcast based on location of an automobile e) provide a radio/television player which has functions of pause and replay which can be selected by the user to deduct time dynamically during the rebroadcast and which:
  1) replays the broadcast
  2) reacts to the need to pause/rewind
  3) resends the adjusted time to server (remote or local)
  4) plays unlistened to material at a later time
  5) displays a list of unlistened/unviewed segments f) use a default play time for the rebroadcast program if no time is specified, and 3) provide a broadcast that fits the time of the listener
  a) clip the resulting program to meet the preferred play time
  b) clip anywhere in the broadcast: beginning, middle or end
  c) user can adjust the time in the middle of the broadcast, the output is dynamically adjusted to the replay plan with the new time parameters, by:
    1) specifying more time is available, or
    2) less time is available With reference to FIG. 2, an exemplary system for implementing the process according to an exemplary embodiment of the invention is illustrated. A remote server is accessible over the Internet by a user computer. The server has an encoded rebroadcast program stored thereon. (A feed can also be provided locally by a virtual server.) The user computer preferably has at least processor, storage and a graphical user interface (GUI).

Figure 3:
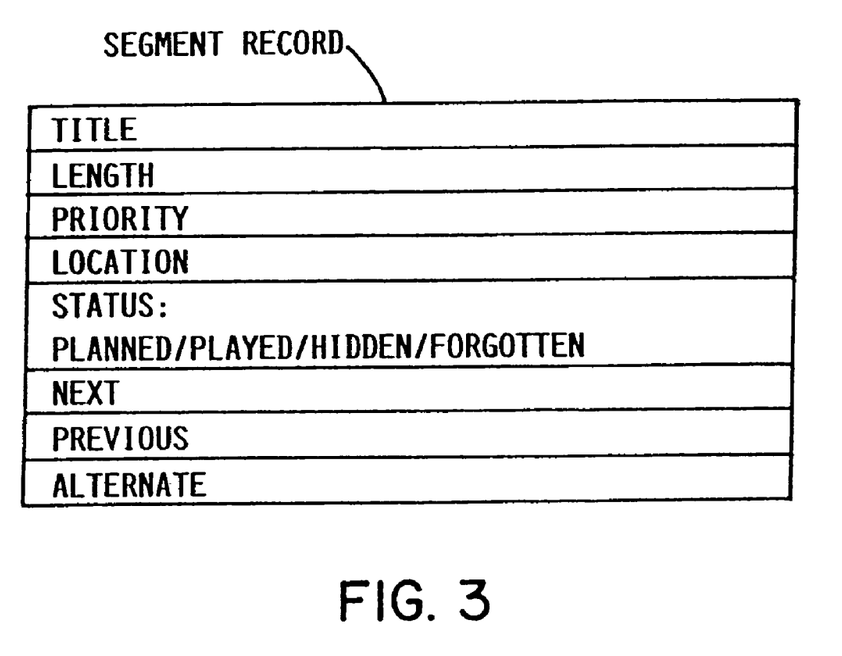
FIG. 3 illustrates an exemplary segment record according to an exemplary embodiment of the invention.

FIG. 3 illustrates an exemplary segment record according to an exemplary embodiment of the invention. As can be seen, an exemplary segment record includes a title, length, priority, location, status, and a next, previous and alternate segment indicator. An optional alternate segment is a segment that is not one of the segments of that particular program that would normally be played when there are no time constraints, but is an alternate segment that would be played instead of a segment of the particular program. In other words, an alternate segment is a different, usually shorter but could be longer, segment which will be played in place of a particular segment due to time or other constraints, for example. An alternate segment would not usually specify another segment as an alternate, and, in particular would not specify a referring segment as its alternate to avoid the possibility of getting into a loop situation.

The status can be planned, played, hidden, or forgotten. Planned indicates that the associated program segment is planned to be played, played indicates that the associated program segment has already been played, and hidden means that the associated program segment will not be played. Forgotten applies to an alternate segment and means that the associated segment has been played and the alternate segment should be hidden permanently and never played, i.e., forgotten.

Figure 4:
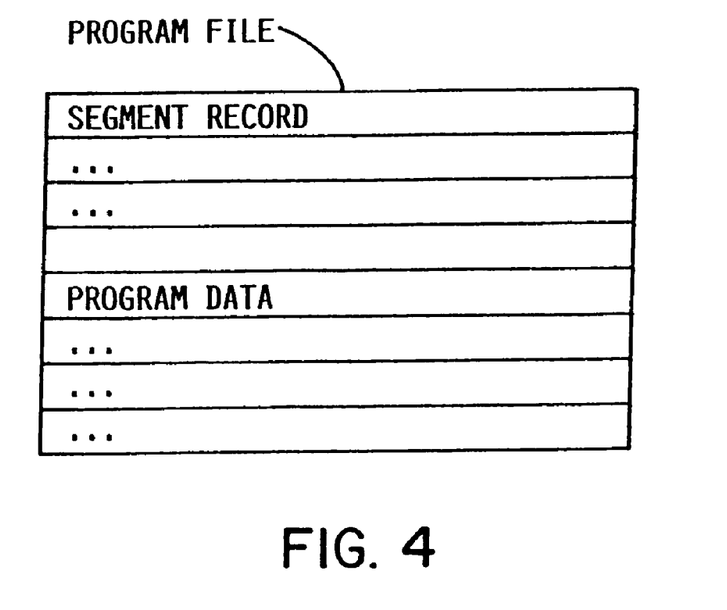
FIG. 4 illustrates an exemplary program file having segment records and program data according to an exemplary embodiment of the invention.

FIG. 4 illustrates an exemplary program file having segment records and program data according to an exemplary embodiment of the invention. The segment records have already been described above. The program data is the digitized audio and/or video material. The program file may be obtained as needed from the server (remote or local). The segment record(s) may be obtained first and then the program data as needed.

Figure 5:
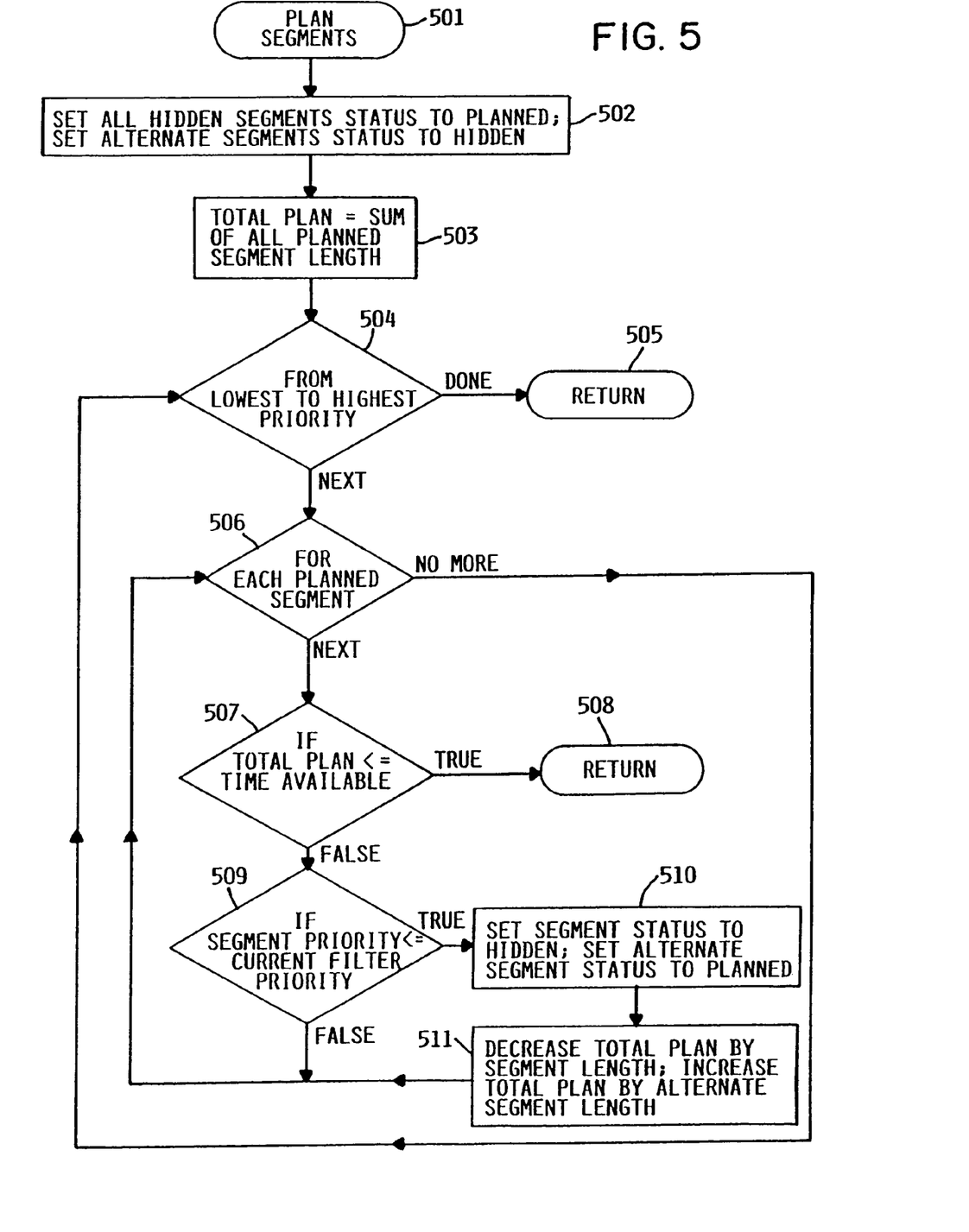
FIG. 5 illustrates a flow chart of an exemplary process of program segment planning according to an exemplary embodiment of the invention.

FIG. 5 illustrates a flow chart of an exemplary process of program segment planning according to an exemplary embodiment of the invention. The process begins at 501. In block 502, all hidden segment status is reset to planned, and all alternate segments (if they exist) are set to hidden. In block 503, the total plan is set to the sum of all planned segment lengths. The total plan thus means the entire program time if all the segments were played. At decision block 504, a loop from lowest to highest priority is started. If the loop has reached the highest priority and there are no more planned segments left, the process is done and flow returns at block 505, otherwise, flow proceeds to decision block 506.

In decision block 506, a loop for each planned segment is begun, until there are no more which would take flow to 504. Decision block 507 checks if the total plan time is less than or equal to the time available, that is, the time specified by the user, the user profile, another program, etc., as described above. If the total plan time is less than the time available (T), then flow proceeds to 508 and the flow returns. Otherwise, flow proceeds to decision block 509 where the current segment priority is tested to see if it is less than or equal to a current filter priority, and if it is (T), flow proceeds to block 510, where the segment status is set to hidden and alternate segment status (if existent) is set to planned, otherwise flow loops back to 506.

After block 510, flow proceeds to block 511 where the total plan is decreased by the current, now hidden, segment length, or, in the case of an alternate segment, the total plan is increased by the alternate segment length. Then flow proceeds to loop back to 506. The above process thus configures a program according to the time specified by a user and taking into consideration the assigned priority of each program segment. It should be noted that alternate segments are optional thus, in blocks 502, 510, 603, 622, the alternate segment status is set only IF the alternate segment exists.)

Figure 6A:
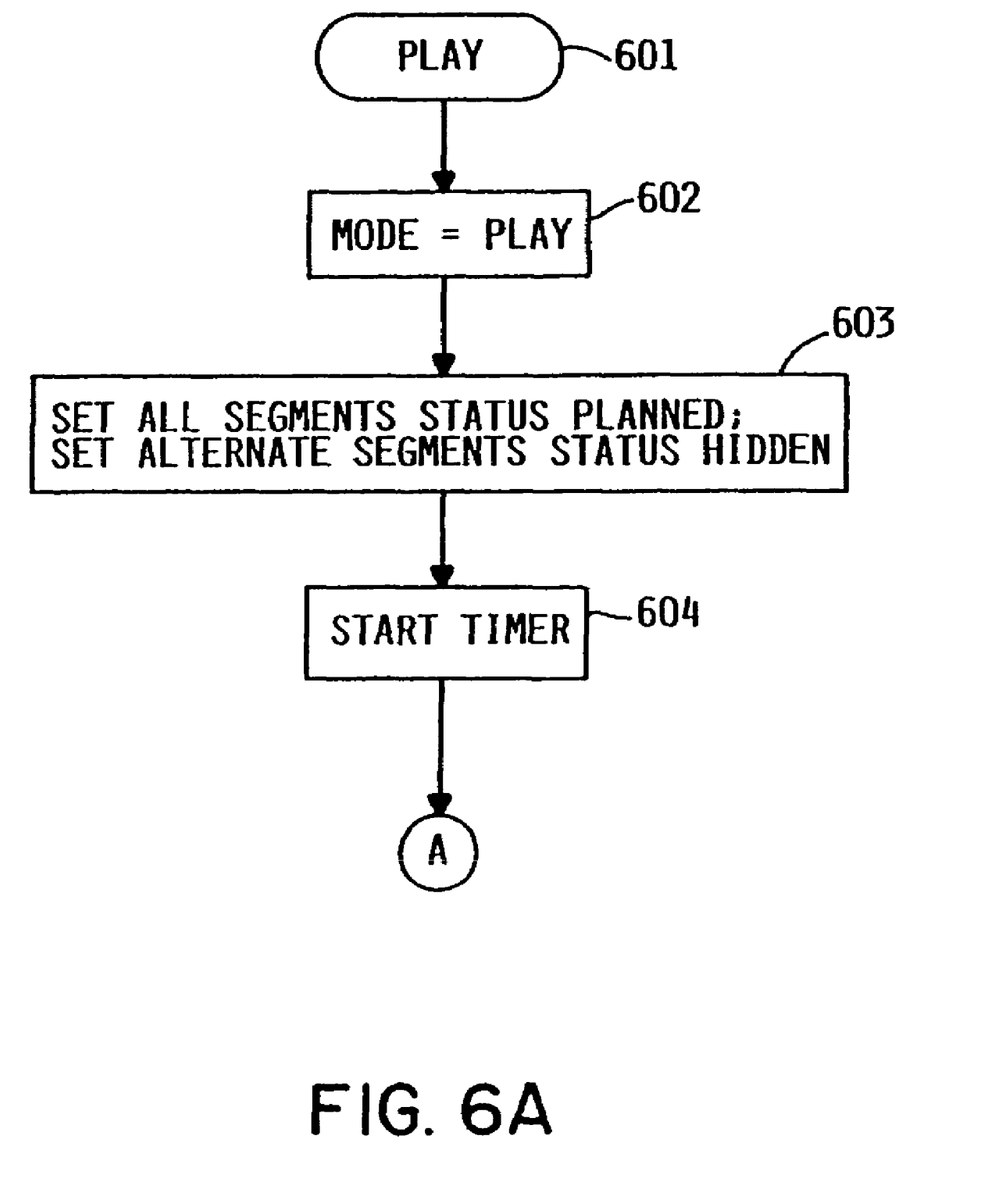
FIGS. 6A-6C illustrate a flow chart of an exemplary process implementing a player according to an exemplary embodiment of the invention.
Figure 6B:
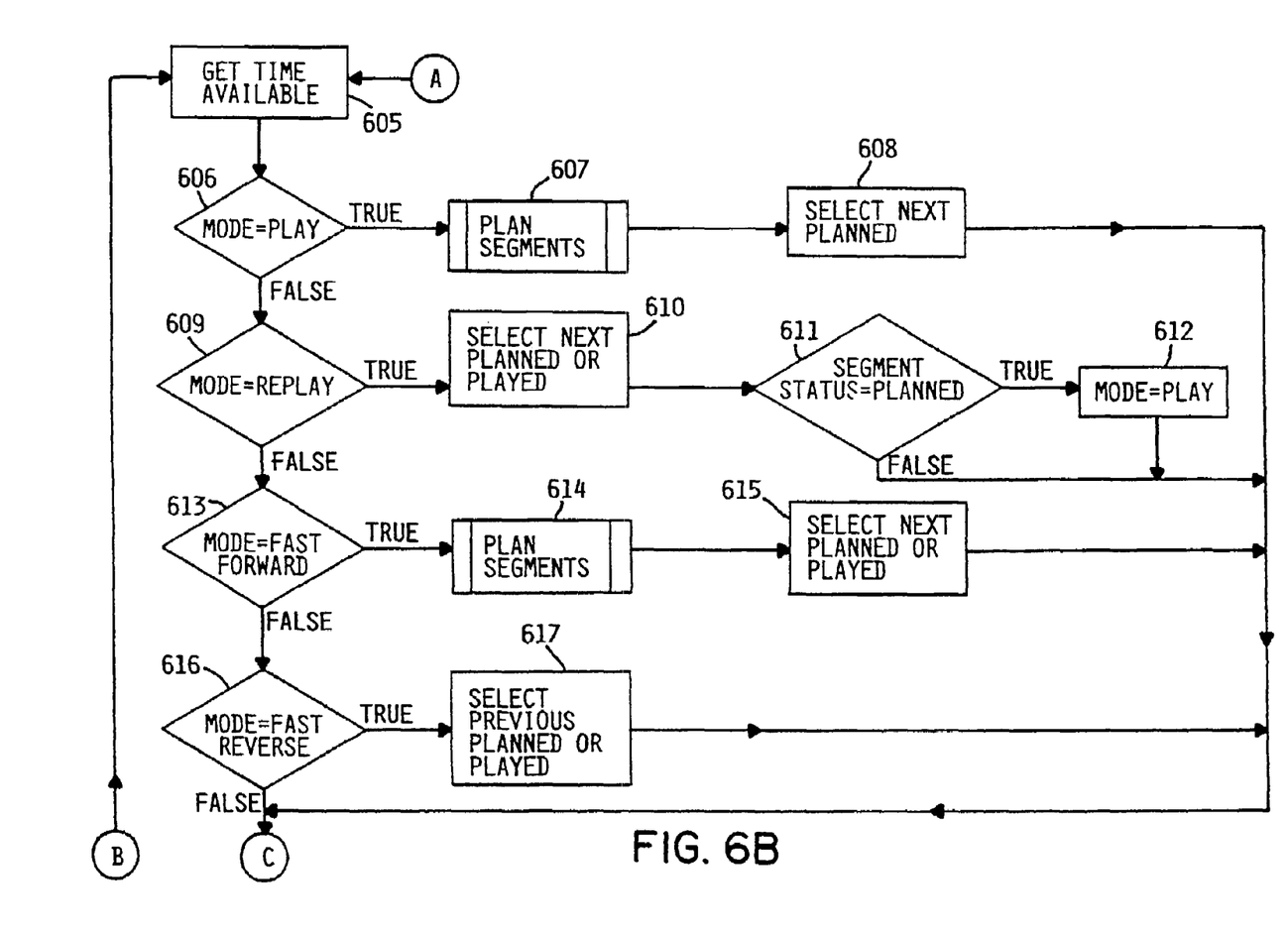
Figure 6C:
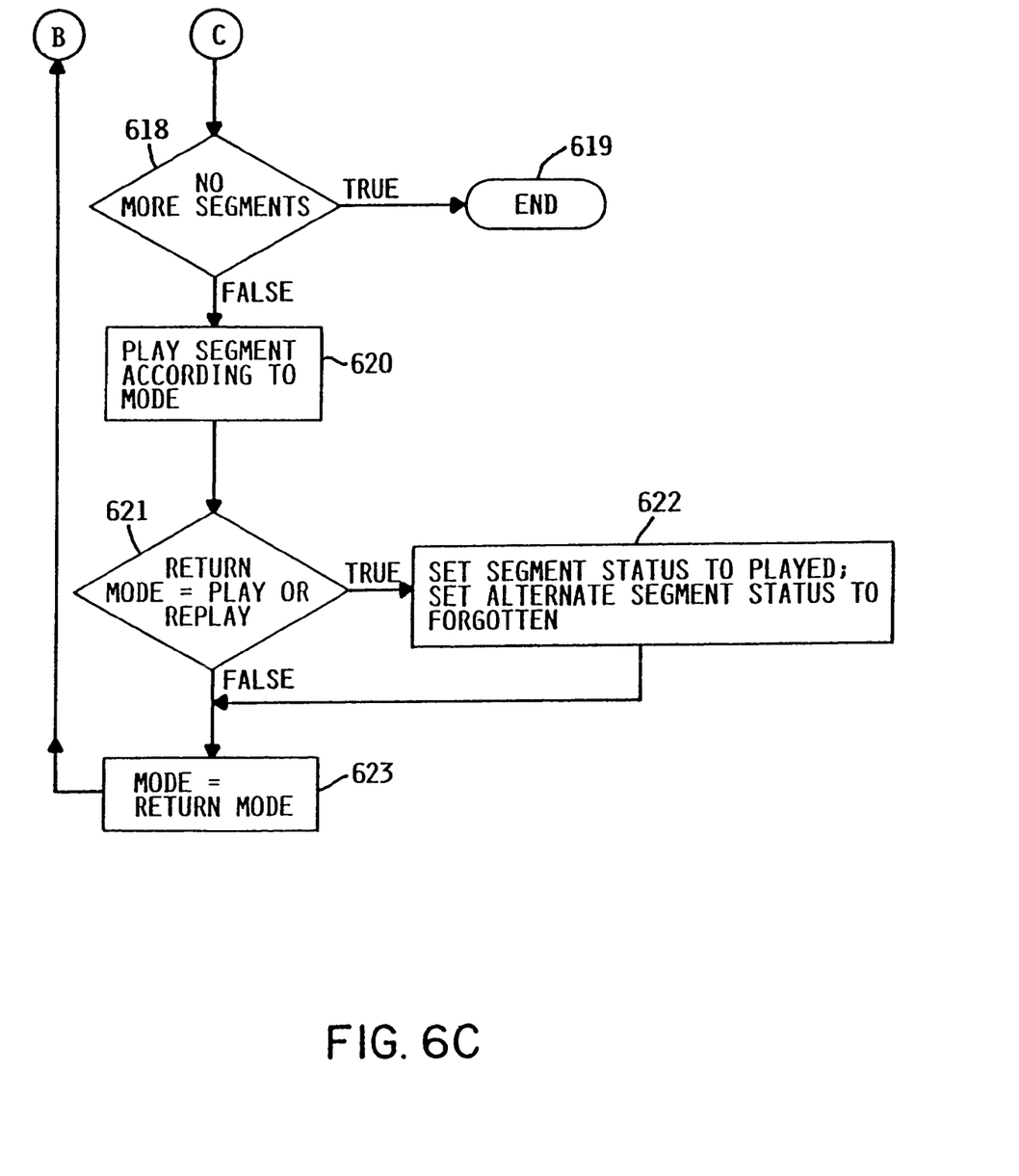

FIGS. 6A-6C illustrate a flow chart of an exemplary process implementing a player according to an exemplary embodiment of the invention. The process begins at 601. In block 602, the mode is set to play, indicating the beginning of the playing process. In block 603, all segments status is set to planned, and alternate segments status is set to hidden. In block 604, a timer is started. In block 605, the time available, which may take into account the elapsed time of the timer from block 604, is retrieved in any of the ways provided, e.g., user input, other programmatic input, etc., and in block 606, if the mode is set to play, then flow proceeds to block 607 to plan which segments to play (the planning process was just described and is illustrated in FIG. 5). In block 608, the next planned segment is selected, and then flow proceeds to decision block 618 to check if there are any more segments.

However, if the mode is set to replay as determined in decision block 609, then flow proceeds to block 610 where the next segment that is planned or played is selected. Flow then proceeds to decision block 611 where it is tested whether the segment status is planned, and if planned (T) flow proceeds to block 612 where the mode is set to play, and flow proceeds to 618. If the result of 611 is that the segment status is not planned (F), flow proceeds to 618 without setting the mode to play.

If the mode is not play in 606, and not replay in 609, then the mode is checked to see if it is fast forward in block 613, in which case flow proceeds to block 614 to plan segments, and then to block 615 to select the next planned or played segment. Then flow proceeds to 618.

If the mode is not play (606), replay (609), or fast forward (613), the flow reaches decision block 616 to determine if the mode is fast reverse, and if so, flow proceeds to 617 to select the previous planned or played segment, and then to 618. Otherwise, flow proceeds to 618 from 616.

In decision block 618, it is determined whether there are any more segments, and if there are no more segments (T), flow proceeds to end 619. If there are more segments (F), then flow proceeds to 620 to play a segment according to the selected mode, i.e., play, replay, fast forward or fast reverse. During this play, the user may select to play, rewind, pause etc., or other programmatic features may control pausing, e.g., in response to an incoming telephone call. When the playing is completed, 620 exits with a return mode indicating the direction in completion status. Then flow proceeds to decision block 621 where it is determined whether the return mode is either play or replay, and if so (T), flow proceeds to 622 to set the segment status to played, or in the case of an alternate segment to forgotten, and then proceeds to 623. Otherwise (F), flow proceeds directly to 623 where the mode is set to return mode, and flow proceeds back to block 605.

The invention may be embodied as a computer program product. A computer program product includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A computer-implemented method of providing audio and/or video programming, comprising:

providing an audio and/or video program in a server, wherein the audio and/or video program comprises a plurality of segment records and program data including a plurality of program segments, each of the segment records is associated with at least one of the program segments and comprises a plurality of fields including a priority field and an alternate segment specifier field, wherein the priority field of each segment record indicates a priority assigned to the at least one program segment associated with that segment record, and wherein the priority assigned is one of at least three possible priorities ranging from a lowest priority to a highest priority, and wherein the alternate segment specifier field of each segment record specifies an alternate program segment that is not normally played at any time when there are no time constraints;

processing a user input of a preferred numerical duration of play time;

providing a replay plan that distinguishes the program segments that are planned to be played from one or more of the program segments that are not planned to be played based on the preferred numerical duration of play time and the priority fields and the alternate segment specifier fields of the segment records; and playing a duration-adjusted version of the audio and/or video program based on the replay plan;

wherein the steps of processing a user input, providing a replay plan, and playing a duration-adjusted version of the audio and/or video program are performed in at least one of the server and a computer having access to the server.

2. The computer-implemented method of providing audio and/or video programming according to claims 1, wherein each of the segment records includes a status field and wherein the step of providing a replay plan includes the step of setting the status field of at least one of the segment records, based on the preferred numerical duration of play time and the priority field of the at least one segment record, to indicate that the program segment associated with the at least one segment record is not planned for playing.

3. The computer-implemented method as recited in claims 1, wherein each of the segment records includes a length field and a status field;

wherein each of the status fields specifies one of planned or hidden;

wherein the step of providing a replay plan comprises:

setting all segments having a hidden status to planned status;

setting all alternate segments status to hidden;

setting a total planned time to the sum of all planned segment lengths;

beginning with a lowest priority segment, for each planned segment, if the total planned time is not less than or equal to the preferred numerical duration of play time, and if a segment priority is less than or equal to a current filter priority, then:

setting the segment's status to hidden, and setting the alternate segment's status to planned, wherein the alternate segment is specified by the segment's alternate segment specifier field;

decreasing the total planned time by the segment's length and increasing the total planned time by the alternate segment's length.

4. A computer readable medium encoded with computer executable instructions that when executed by the computer result in:

processing a user input of a preferred numerical duration of play time;

providing a replay plan for an audio and/or video program, wherein the audio and/or video program comprises a plurality of segment records and program data including a plurality of program segments, each of the segment records is associated with at least one of the program segments and comprises a plurality of fields including a priority field and an alternate segment specifier field, wherein the priority field of each segment record indicates a priority assigned to the at least one program segment associated with that segment record, wherein the priority assigned is one of at least three possible priorities ranging from a lowest priority to a highest priority, and wherein the alternate segment specifier field of each segment record specifies an alternate program segment that is not normally played at any time when there are no time constraints, and wherein the step of providing a replay plan includes the step of distinguishing the program segments that are planned to be played from one or more of the program segments that are not planned to be played based on the preferred numerical duration of play time and the priority fields and the alternate segment specifier fields of the segment records; and playing a duration-adjusted version of the audio and/or video program based on the replay plan.

5. The computer readable medium of claim 4, wherein each of the segment records includes a length field and a status field;

wherein each of the status fields specifies one of planned or hidden;

wherein the step of providing a replay plan comprises:

setting all segments having a hidden status to planned status;

setting all alternate segments status to hidden;

setting a total planned time to the sum of all planned segment lengths;

beginning with a lowest priority segment, for each planned segment, if the total planned time is not less than or equal to the preferred numerical duration of play time, and if a segment priority is less than or equal to a current filter priority, then:

setting the segment's status to hidden, and setting the alternate segment's status to planned, wherein the alternate segment is specified by the segment's alternate segment specifier field;

decreasing the total planned time by the segment's length and increasing the total planned time by the alternate segment's length.

6. A computer readable medium encoded with computer executable instructions that when executed by the computer result in:

processing a user input of a preferred numerical duration of play time, wherein a program that automatically inputs the preferred numerical duration of play time;

providing a replay plan for an audio and/or video program, wherein the audio and/or video program comprises a plurality of segment records and program data including a plurality of program segments, each of the segment records is associated with at least one of the program segments and comprises a plurality of fields including a priority field and an alternate segment specifier field, wherein the priority field of each segment record indicates a priority assigned to the at least one program segment associated with that segment record, wherein the priority assigned is one of at least three possible priorities ranging from a lowest priority to a highest priority, and wherein the alternate segment specifier field of each segment record specifies an alternate program segment that is not normally played at any time when there are no time constraints, and wherein the step of providing a replay plan includes the step of distinguishing the program segments that are planned to be played from one or more of the program segments that are not planned to be played based on the preferred numerical duration of play time and the priority fields and the alternate segment specifier fields of the segment records; and playing a duration-adjusted version of the audio and/or video program based on the replay plan.

7. The computer readable medium of claim 6, wherein the program that automatically inputs the numerical time duration is an automotive system which automatically inputs the numerical time duration by estimating a drive-time-remaining value based on at least one of time-of-day, vehicle speed, and vehicle location.

8. The computer readable medium of claim 6, wherein the program that automatically inputs the numerical time duration is a parental control system which automatically inputs the numerical time duration by calculating a child's time-remaining value based on a preassigned daily allocation.

9. The computer readable medium of claim 6, wherein the program that automatically inputs the numerical time duration is a scheduling program which automatically inputs the numerical time duration by calculating a time-remaining value based on a scheduled time of a calendared event.

10. The computer readable medium of claim 6, wherein each of the segment records includes a length field and a status field;

wherein each of the status fields specifies one of planned or hidden;

wherein the step of providing a replay plan comprises:

setting all segments having a hidden status to planned status;

setting all alternate segments status to hidden;

setting a total planned time to the sum of all planned segment lengths;

beginning with a lowest priority segment, for each planned segment, if the total planned time is not less than or equal to the preferred numerical duration of play time, and if a segment priority is less than or equal to a current filter priority, then:

setting the segment's status to hidden, and setting the alternate segment's status to planned, wherein the alternate segment is specified by the segment's alternate segment specifier field;

decreasing the total planned time by the segment's length and increasing the total planned time by the alternate segment's length.

11. The computer readable medium of claim 10, wherein the program that automatically inputs the numerical time duration is an automotive system which automatically inputs the numerical time duration by estimating a drive-time-remaining value based on at least one of time-of-day, vehicle speed, and vehicle location.

12. The computer readable medium of claim 10, wherein the program that automatically inputs the numerical time duration is a parental control system which automatically inputs the numerical time duration by calculating a child's time-remaining value based on a preassigned daily allocation.

13. The computer readable medium of claim 10, wherein the program that automatically inputs the numerical time duration is a scheduling program which automatically inputs the numerical time duration by calculating a time-remaining value based on a scheduled time of a calendared event.

14. A computer-implemented method of providing audio and/or video programming, comprising the steps of:

providing an audio and/or video program in a server, wherein the audio and/or video program comprises a plurality of segment records and program data including a plurality of program segments, each of the segment records is associated with one of the program segments and comprises a plurality of fields including a length field, a priority field, a status field, and an alternate segment specifier field, wherein the priority field of each segment record indicates a priority assigned to the program segment associated with that segment record, wherein the priority assigned is one of at least three possible priorities ranging from a lowest priority to a highest priority, and wherein the alternate segment specifier field of each segment record specifies an alternate program segment that is not normally played at any time when there are no time constraints;

processing a user input of a preferred numerical duration of play time;

providing a replay plan based on the preferred numerical duration of play time and the priority fields of the segment records; and playing a duration-adjusted version of the audio and/or video program based on the replay plan;

wherein the steps of processing a user input, providing a replay plan, and playing a duration-adjusted version of the audio and/or video program are performed in at least one of the server and a computer having access to the server;

wherein each of the status fields specifies one of planned or hidden;

wherein the step of providing a replay plan based on the preferred numerical duration of play time and the priority fields of the segment records comprises:

setting all segments having a hidden status to planned status;

setting all alternate segments status to hidden;

setting a total planned time to the sum of all planned segment lengths;

beginning with a lowest priority segment, for each planned segment, if the total planned time is not less than or equal to the preferred numerical duration of play time, and if a segment priority is less than or equal to a current filter priority, then:

setting the segment's status to hidden, and setting the alternate segment's status to planned, wherein the alternate segment is specified by the segment's alternate segment specifier field;

decreasing the total planned time by the segment's length and increasing the total planned time by the alternate segment's length.

15. The computer-implemented method as recited in claim 14, wherein the program segments of the audio and/or video program include a first program segment and a second program segment, wherein the second program segment is shorter than the first program segment, and wherein the second program segment is not normally played at any time when there are no time constraints;

wherein a first one of the segment records is associated with the first program segment, and wherein the alternate segment specifier field of the first program segment specifies the second program segment, wherein a second one of the segment records is associated with the second program segment, and wherein during the step of providing a replay plan based on the preferred numerical duration of play time and the priority fields of the segment records, if the total planned time is not less than or equal to the preferred numerical duration of play time, and if the segment priority of the first program segment is less than or equal to a current filter priority, then:

setting the status of the first program segment to hidden, and setting the status of the second program segment to planned;

decreasing the total planned time by the length of the first program segment and increasing total planned time by the length of the second program segment.

16. The computer-implemented method as recited in claim 15, wherein the second program segment is a shortened-duration version of the first program segment.

17. The computer-implemented method as recited in claim 16, wherein the first program segment and the second program segment are commercials.

* * * * *